Nov. 17, 1925.  1,561,861
W. D. KMENTT
ABRADING MACHINE
Filed Jan. 16, 1922  2 Sheets-Sheet 1
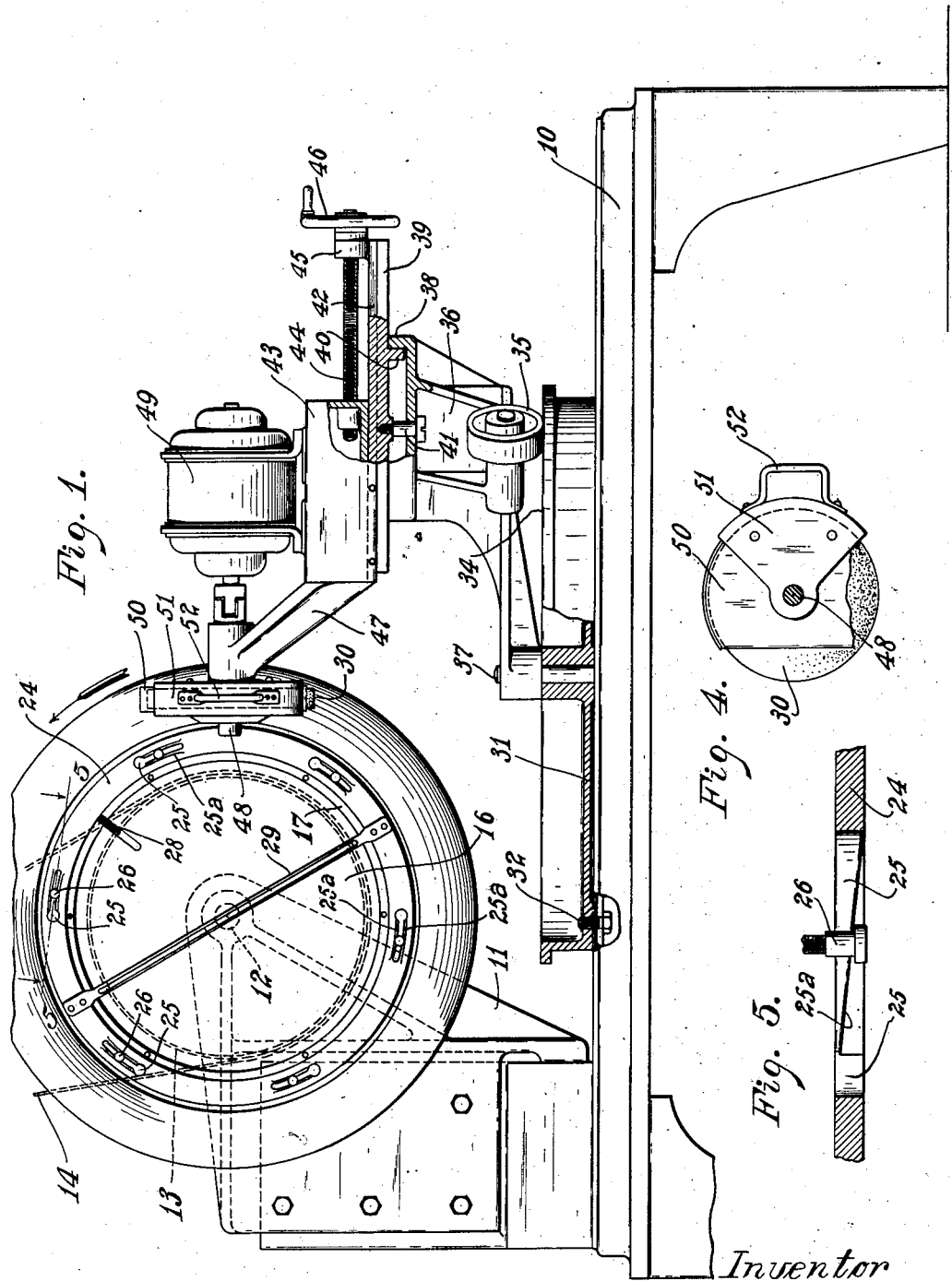
Inventor
W. D. Kmentt.
By Robert M. Pierson
Atty.

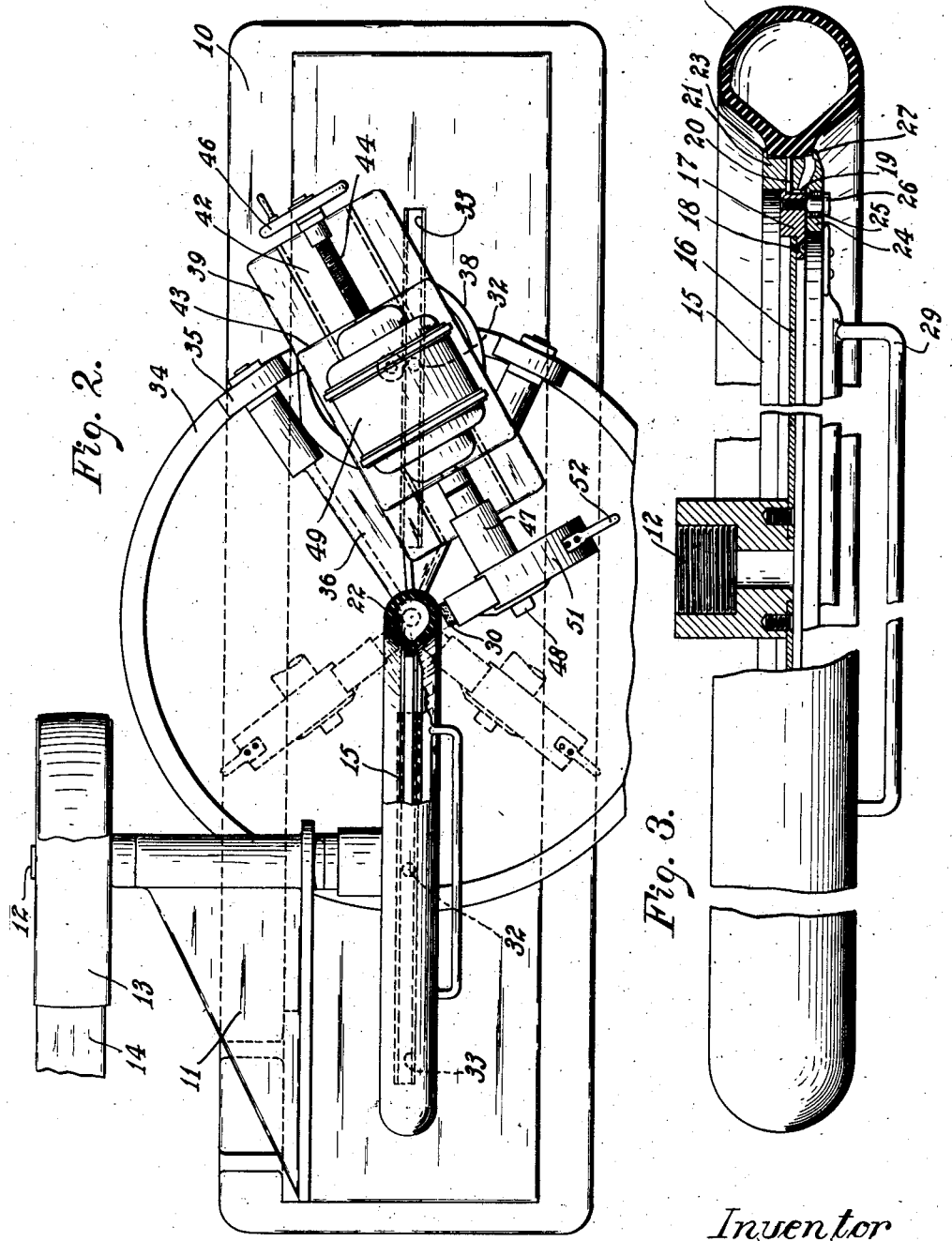

Patented Nov. 17, 1925.

1,561,861

UNITED STATES PATENT OFFICE.

WALDEMAR D. KMENTT, OF AKRON, OHIO, ASSIGNOR TO THE B. F. GOODRICH COMPANY, OF NEW YORK, N. Y., A CORPORATION OF NEW YORK.

ABRADING MACHINE.

Application filed January 16, 1922. Serial No. 529,423.

*To all whom it may concern:*

Be it known that I, WALDEMAR D. KMENTT, a citizen of the United States, residing at Akron, in the county of Summit and State of Ohio, have invented a certain new and useful Abrading Machine, of which the following is a specification.

This invention relates to abrading machines, and its general object is to provide an improved machine for abrading an article, throughout a considerable surface area, to a substantially uniform depth, or to a desired surface contour. A more specific object is to provide a rapid, accurate and dependable machine for abrading an article of annular form, as in the case of buffing off the over-cured surface of the rubber bags commonly used as expansible cores in vulcanizing certain types of pneumatic tires; such buffing being desirable, for example, as a preliminary to re-covering the bags for further use as described in U. S. Patent No. 1,452,326, issued April 17, 1923, upon an application of James D. Tew. I do not claim to be the inventor of the subject matter of said patent.

Of the accompanying drawings:

Fig. 1 is a side elevation, with parts broken away and in section, of a bag-buffing machine embodying and adapted to carry out a preferred form of my invention, with the work in place.

Fig. 2 is a plan view of the same, with parts broken away and in section.

Fig. 3 is a fragmentary plan view on a larger scale of the work-holding chuck, with the work mounted thereon, showing certain parts in section.

Fig. 4 is a side view of the abrading wheel and a shield therefor, a part of the shield being broken away.

Fig. 5 is a horizontal section on line 5—5 of Fig. 1.

Referring to the drawings, 10 is a table upon which is mounted a journal-bracket 11, in which is mounted a horizontal shaft 12, disposed transversely of the table, and provided at its rear end with a pulley 13 driven by a belt 14 and at its front end with a work-holding chuck 15. Said chuck comprises a disc 16 (Fig. 3) upon which is secured an inner rim member 17 by means of screws, one of which is shown at 18, the outer periphery of said inner rim member being formed at intervals with transverse grooves, one of which is shown at 19, extending from its front face slightly past its middle plane, said grooves being adapted to receive studs, one of which is shown at 20, (Fig. 3), extending from the inner periphery of a detachable outer rim-member 21, the ends of said grooves limiting the rearward axial movement of said outer rim.

The outer face of the outer rim member 21 is cylindrical and of such diameter as to receive, preferably under more or less tension, the work 22, here shown as a rubber bag such as is commonly used as an expansible core for tires and referred to as a "water-bag". At the rear side of said cylindrical outer surface, the detachable outer rim member 21 is provided with a circumferential flange 23 to limit the rearward axial movement of the work upon said rim member. 24 is an annular clamping plate formed with circumferentially disposed locking slots 25, 25, flanked by inclined cam surfaces 25ª, 25ª, said slots being adapted to receive headed stud bolts 26, 26, extending from the front face of the inner rim 17, for holding said clamping plate toward said inner rim with its outer margin pressing on the work, as indicated at 27 (Fig. 3) and thereby holding the work upon the detachable rim 21 and the latter upon the inner rim 17. The outer and inner rim and the disc 16 are appropriately cut through to accommodate the valve stem 28 (Fig. 1) of the water-bag. The clamping plate 24 is provided with a diametric handle 29 to facilitate its attachment to and removal from the chuck, these operations requiring, with the construction here shown, a circumferential movement of the plate relative to the chuck. I do not wholly limit my claims, however, to the specific means here shown for securing and rotating the work.

The mounting for the abrading wheel, which latter is designated by the numeral 30, comprises a supporting member 31 adjustably secured upon the table 10 by means of clamping bolts 32, 32, mounted in slots 33, 33, in said table, said supporting member thus being adapted to be adjusted from and toward the chuck 15.

The supporting member 31 is formed with a circular track-way 34 on its upper face for a supporting roller 35 journaled on a carriage 36, the latter being pivoted on the member 31 at 37, concentrically with respect to said track-way. The carriage 36 is provided at its top with an upstanding circular flange 38 upon which rests a turn-table 39 formed with a downwardly extending flange 40 rotatably fitting within the flange 38. 41 is a pivot pin rotatably mounted in a part of the carriage 36 and threaded into the bottom of the turn-table 39, which latter is thus pivoted concentrically with respect to the flanges 38, 40. The upper side of the turn-table is formed with a dove-tail guide 42 upon which is mounted a slide 43. 44 is a feed-screw, swiveled in a bracket 45 on the turn-table, threaded through a part of the slide 43, and provided with a hand-wheel 46, for adjusting said slide 43 on the turn-table 39.

The slide 43 is provided with a bearing bracket 47, for the shaft 48 of the abrading wheel 30 and 49 is a motor mounted on said slide for driving said shaft.

The abrading wheel 30 is provided with a guard 50 secured within a segmental stirrup-like member 51, which latter, if desired, may be secured against turning with respect to the bracket 47 by any known or suitable means. 52 is a handle upon the member 51, for turning the turn-table 39 about its pivot pin 41 to hold the abrading wheel against the work.

In the operation of the device the clamping plate 24 is unlocked from the chuck 15 by turning it clockwise, as viewed in Fig. 1, relatively to said chuck, by means of the handle 29, so that the heads of the stud bolts 26 may pass freely through the large ends of the slots 25, and removed from said chuck. If a water-bag of a new size is to be buffed, the outer rim member 21 is pulled forward off the inner rim member 17, the studs 20 sliding in the grooves 19, and is substituted by another outer rim member of proper outer diameter for the new work. For work of extremely large or small size an inner rim member of different outer diameter may also be substituted for the inner rim member 17.

The work is mounted upon the outer rim member, and the clamping plate 24 replaced to hold it thereon. The carriage-supporting member 31 is then adjusted upon the table 10 to bring the pivotal axis 37 of the carriage 36 substantially under the center of the segment of the work upon which the abrading wheel is to operate, and the carriage is then secured by means of the clamping bolts 32. The slide 43 is then adjusted on the turn-table 39, by means of the hand-wheel 46, to bring the abrading wheel 30 into proper operative position with respect to the work. Power is applied through the belt 14 to rotate the work, preferably counter-clockwise, as viewed in Fig. 1, so that it moves upward past the abrading wheel, while the latter is driven by the motor 49, preferably clockwise, as viewed from the motor, so that the abraded particles are thrown downward, the contacting surfaces of the work and of the abrading wheel thus moving in opposite directions, and the latter preferably at the greater peripheral speed.

The abrading wheel is held against the work by means of the handle 52, abrading a circumferential zone about the work, as the latter revolves, and the abraded zone is gradually extended laterally around the work by turning the carriage 36 about its pivot 37.

By adjustment of the slide 43 upon the turn-table 39, either the middle part of the abrading face of the wheel, or a corner thereof, may be presented to the surface of the water-bag as the abrading wheel moves about the arcuate crown of the latter, and by such adjustment, combined with adjustment of the turn-table or the carriage, or both, the abrasion may also be carried down to the base portion of the water-bag, although said portion varies from true circular form, or the contour of the work may be followed merely by pivotal movement of the carriage 36 and of the turntable 39 thereon, although I prefer to move the abrading wheel axially, by driving the slide, in carrying the abrading operation toward or from the inner periphery of the core, as this movement is simpler and permits the abrading wheel to be held in proper angular relation to the work. The several members of the supporting structure for the abrading wheel, while holding the latter against displacement by the tractive force of the work, are so joined with each other as to permit the wheel to be presented to any part of the cross-section of the work and at a chosen or variable angle to the adjacent surface thereof. If the work consists of a water-bag having very flexible walls, its shape may be maintained against the pressure of the abrading wheel by inflating it.

The several adjustments or movements of the carriage, turn-table and slide may readily be effected by manipulation of the handle 52 and the hand wheel 46, they being on opposite sides of the pivotal axis of the turn-table. The apparatus may be of strong construction and yet susceptible of very minute adjustment and accurate control. It is highly effective, easily operated, and may readily be adapted to work upon articles of different size or shape.

By continuously rotating the core so as to first buff a narrow, annular, longitudinal zone upon the bag, and then moving the abrading wheel transversely about the work to broaden said abraded zone, it is possible, notwithstanding the flexible character of the bag, to abrade it to substantially the same depth throughout its longitudinal circumference, at a given part of its cross-section, so that when the abrading operation is completed the bag will be of substantially the same cross-sectional contour throughout. Thus by taking care to abrade the bag to a desired cross-sectional contour at one circumferential point it is abraded to substantially the same contour throughout its longitudinal circumference.

Modifications may be resorted to without departing from the scope of my invention, and I do not wholly limit my claims to the specific construction shown.

I claim:

1. Apparatus for buffing an annular, rubber tire-core, said apparatus comprising means adapted to support and rotate said core upon a fixed axis, said means so fitting within the core as substantially to tension the same, an abrading wheel, and a support for said abrading wheel adapted to be swung transversely about the work.

2. Apparatus for buffing an annular, flexible, rubber article, said apparatus comprising power driven means for rotatably supporting said article, said means engaging the inner periphery of said article substantially throughout the latter's circumference, an abrading member, and a support for the latter movable transversely about the abrading region of the work's orbit.

3. In an abrading machine for an annular article, the combination of means for supporting said article and rotating it in its own plane upon a fixed axis, an abrading member, and means for supporting said abrading member and moving it transversely around the contour of the work, the last said means comprising a support adapted to be swung about an axis substantially tangent to the work and a second support pivoted on the first said support for movement of the abrading member from and toward the work.

4. A machine as defined in claim 3 in which the pivoted axes of the two supports are parallel.

5. In an abrading machine for an annular article, the combination of means for supporting said article and rotating it in its own plane upon a fixed axis, an abrading member, and means for supporting said abrading member and moving it transversely around the contour of the work, the last said means comprising a series of three superposed supports, two of the same being pivotally mounted and the other being slidably mounted.

6. In an abrading machine for an annular article the combination of means for supporting said article and rotating it in its own plane, an abrading member, a carriage therefor so mounted as to be oscillated about a segment of said article upon which said abrading member operates, a member pivoted on said carriage, and a support for said abrading member slidably mounted on said pivoted member.

7. In an abrading machine for an annular article the combination of a chuck comprising an inner rim member, a detachable outer rim member mounted thereon and adapted to receive the work, means for driving said chuck, an abrading member, a carriage therefor so mounted as to be movable about a segment of the work, and an adjustable support for said carriage.

8. In apparatus of the character described, a chuck comprising an inner rim member, an outer rim member detachably mounted thereon and adapted to receive the work, means on said outer rim member for limiting the axial movement of the work in one direction thereon, and, a quick detachable clamping plate adapted to press the work against said limiting means, in combination with means for supporting and rotating said chuck, an abrading tool, and supporting means therefor adapted to be moved transversely about the contour of an annular article mounted upon said chuck.

9. In apparatus of the character described, a chuck comprising an inner rim member, an outer rim member mounted thereon and adapted to receive the work, means for limiting the axial movement of said outer rim member on said inner rim member in one direction, means on said outer rim-member for limiting the axial movement of the work in said direction, and a quick detachable clamping plate for preventing displacement of the work and of said outer rim-member in the opposite direction, in combination with means for supporting and rotating said chuck, an abrading tool, and supporting means therefor adapted to be moved transversely about the contour of an annular article mounted upon said chuck.

10. An abrading machine comprising means for supporting the work, a carriage so mounted as to be movable in an arc about the work, an abrading wheel, and a bearing member therefor slidably and pivotally mounted on said carriage.

11. An abrading machine comprising means for supporting the work, a carriage adapted to be oscillated about the work, a pivoted structure mounted on said carriage, an abrading wheel mounted on said pivoted structure, and handles on said pivoted structure on opposite sides of the latter's pivotal axis.

12. An abrading machine comprising means for supporting the work, a carriage so mounted as to be movable about the work, a pivoted member mounted on said carriage, a slide mounted on said pivoted member, an abrading wheel mounted on said slide, a handle connected with said slide and positioned on one side of the pivotal axis of said pivoted member, and a feed screw for said slide having its handle member on the other side of said pivotal axis.

13. Apparatus for the purpose described, comprising a rotary support for an air bag, an arm pivoted on a supporting member and having its pivotal axis passing through the center of the portion of the air bag which is intersected by a plane which passes through the axis of the rotary support perpendicular to the axis of said arm, and a rotary buffing wheel supported by said arm.

14. Apparatus for the purpose described, comprising a support for an air bag journaled to rotate about a horizontal axis, an arm having an offset upper portion, a support upon which said arm is pivoted to swing about a vertical axis, means for imparting rectilinear movement to said support, a buffing wheel carrier mounted at the upper end of said arm, means for imparting rectilinear movement to said buffing wheel carrier, and a buffing wheel rotatably mounted on said carrier with means for operating it.

15. In combination, a rotary chuck for an air bag, a horizontally adjustable member, an arm having one end pivoted to said member on an axis perpendicular to the axis of said chuck, anti-friction bearings for said arm, said arm having an offset portion, a carrier adjustably carried by the offset portion of said arm, and a buffing wheel supported by said carrier with means for operating it.

16. In combination, a rotary chuck for an air bag, an arm, a supporting member on which one end of said arm is pivoted to enable the arm to swing about an axis perpendicular to the axis of the chuck, means for imparting rectilinear movement to said support in a plane parallel to the axis of the chuck, said arm having its other end offset from its pivot, a buffing wheel supported by said arm with means for operating it, and means for adjusting said buffing wheel on said pivoted arm.

17. In combination, a rotary chuck for an air bag journaled upon a horizontal shaft, a slide member with means for imparting rectilinear movement thereto in a horizontal plane, an arm having an offset end, a slide member carried by said offset end with means for imparting movement thereto in a horizontal plane, a buffing wheel supported by said last named slide member, and means for moving said slide member.

In witness whereof I have hereunto set my hand this 13th day of January, 1922.

WALDEMAR D. KMENTT.